United States Patent
Ge et al.

(10) Patent No.: US 12,124,593 B2
(45) Date of Patent: Oct. 22, 2024

(54) INFORMATION SECURITY-ORIENTED RECONFIGURABLE SYSTEM CHIP COMPILER AND AUTOMATIC COMPILATION METHOD

(71) Applicant: SOUTHEAST UNIVERSITY, Jiangsu (CN)

(72) Inventors: Wei Ge, Jiangsu (CN); Chongyang Li, Jiangsu (CN); Leidong Zheng, Jiangsu (CN); Yifei Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 211 days.

(21) Appl. No.: 17/992,132

(22) Filed: Nov. 22, 2022

(65) Prior Publication Data
US 2023/0081697 A1 Mar. 16, 2023

(30) Foreign Application Priority Data
Jun. 15, 2022 (CN) .......................... 202210679223.X (51) Int. Cl.
G06F 21/60 (2013.01)
G06F 8/41 (2018.01)
G06F 9/445 (2018.01)

(52) U.S. Cl.
CPC ................................. *G06F 21/602* (2013.01)

(58) Field of Classification Search
CPC ....................................................... G06F 21/602
USPC ........................................................... 726/26
See application file for complete search history.

(56) References Cited

U.S. PATENT DOCUMENTS

| | | | | |
|---|---|---|---|---|
| 6,785,873 B1* | 8/2004 | Tseng | ...................... | G06F 30/33 |
| | | | | 716/108 |
| 6,871,341 B1* | 3/2005 | Shyr | ...................... | G06F 8/4441 |
| | | | | 717/131 |
| 9,135,384 B1* | 9/2015 | Santan | ................ | G06F 30/3308 |
| 10,671,785 B1* | 6/2020 | Mihalache | ............ | G06F 30/367 |

(Continued)

OTHER PUBLICATIONS

Steve Leibson; Configurable Processors: A New Era in Chip Design; IEEE:2002; pp. 51-60.*

(Continued)

*Primary Examiner* — Monjur Rahim
(74) *Attorney, Agent, or Firm* — MUNCY, GEISSLER, OLDS & LOWE, P.C.

(57) ABSTRACT

The present disclosure discloses an information security application-oriented reconfigurable system chip compiler and an automatic compilation method. The method includes the following steps: firstly, inputting a source program of a cryptographic algorithm; then, executing a software compilation function syntax check of the source program, and when the check result is passed, performing compilation mapping using a compiler; next, executing the cryptographic algorithm by simulation running using a simulator, and generating a configuration code by a simulator array; and finally, guiding a hardware behavior operation using a binary configuration code file generated by the simulator. The reconfigurable system chip compiler includes a source program input module, a software compilation function verification module, a compilation mapping module, a simulation execution module, a configuration code generation module, and a hardware debugging module.

10 Claims, 6 Drawing Sheets

(56) References Cited

U.S. PATENT DOCUMENTS

| | | | | |
|---|---|---|---|---|
| 10,685,587 | B2* | 6/2020 | Rietman | H04L 9/004 |
| 11,787,434 | B2* | 10/2023 | Patne | B60W 50/12 |
| | | | | 701/1 |
| 11,799,866 | B2* | 10/2023 | Burlitskiy | H04L 63/102 |
| 11,868,479 | B2* | 1/2024 | Lysecky | G06F 21/566 |
| 12,008,100 | B2* | 6/2024 | Patne | G07C 5/0816 |
| 12,032,841 | B2* | 7/2024 | Zhang | G06F 8/433 |
| 12,034,601 | B2* | 7/2024 | Fang | H04L 41/28 |
| 12,056,012 | B2* | 8/2024 | Shah | G06F 11/1441 |
| 12,056,428 | B1* | 8/2024 | Cao | G06F 30/3315 |
| 12,058,003 | B2* | 8/2024 | Fang | H04L 41/28 |
| 2005/0005250 | A1* | 1/2005 | Jones | G06F 30/30 |
| | | | | 710/34 |
| 2005/0193184 | A1* | 9/2005 | Kohno | G06F 30/30 |
| | | | | 716/120 |
| 2006/0277533 | A1* | 12/2006 | Fiske | G06F 8/41 |
| | | | | 717/137 |
| 2007/0198971 | A1* | 8/2007 | Dasu | G06F 8/4432 |
| | | | | 717/140 |
| 2007/0288668 | A1* | 12/2007 | Fiske | G06F 15/163 |
| | | | | 710/100 |
| 2009/0187733 | A1* | 7/2009 | El-Ghazawi | G06F 15/7867 |
| | | | | 712/15 |
| 2011/0219208 | A1* | 9/2011 | Asaad | G06F 9/06 |
| | | | | 712/12 |
| 2013/0205295 | A1* | 8/2013 | Ebcioglu | G06F 15/7871 |
| | | | | 718/1 |
| 2014/0176187 | A1* | 6/2014 | Jayasena | G06F 15/7867 |
| | | | | 326/39 |
| 2015/0254180 | A1* | 9/2015 | Shi | G06F 12/0895 |
| | | | | 711/122 |
| 2019/0250941 | A1* | 8/2019 | Rooke | G06F 9/5072 |
| 2020/0142857 | A1* | 5/2020 | Catiller | G06F 9/3867 |
| 2020/0183669 | A1* | 6/2020 | Mola | G06F 11/3648 |
| 2021/0103681 | A1* | 4/2021 | Das | H03K 17/687 |
| 2021/0149837 | A1* | 5/2021 | Mishra | G06F 15/7807 |
| 2021/0234767 | A1* | 7/2021 | Ricci | G06F 21/10 |
| 2022/0198023 | A1* | 6/2022 | Gopinath | G06F 9/455 |
| 2022/0206697 | A1* | 6/2022 | Zhang | G06F 8/433 |
| 2023/0342316 | A1* | 10/2023 | Binet | G06F 12/0831 |
| 2023/0385493 | A1* | 11/2023 | Ray | G06F 30/327 |
| 2024/0265287 | A1* | 8/2024 | Qiang | H04B 10/70 |
| 2024/0267188 | A1* | 8/2024 | Elsherif | H04L 5/0053 |

OTHER PUBLICATIONS

Jeffery P Hammes et al., A High Level, Algorithmic Programming Language and Compiler for Reconfigurable Systems, Jan. 1, 2000, 7 pages.

G. Dimitroulakos, M. D. Galanis and C. E. Goutis, "A Compiler Method for Memory-Conscious Mapping of Applications on Coarse-Grained Reconfigurable Architectures," *19th IEEE International Parallel and Distributed Processing Symposiumm*, Jan. 1, 2005 pp. 4.

Wei, Ge & Jinjiang, Yang & Jun, Yang. (2016). High Performance and Area Efficiency Design of Global Register File for Coarse-Grained Reconfigurable Cryptographic Processor. IEICE Electronics Express. Jul. 13-15, 2016, 8 pages.

Koenig, R., Bauer, et al. Kahrisma: a Novel Hypermorphic Reconfigurable-Instruction-Set Multi-Grained-Array Architecture, In *2010 Design, Automation & Test in Europe Conference & Exhibition*, IEEE, Mar. 2010, pp. 819-824.

Antti Pelkpnen et al., Pelkonen, Antti, Kostas Masselos, and Miroslav Cupák. "System-Level Modeling of Dynamically Reconfigurable Hardware With SystemC." *Proceedings International Parallel and Distributed Processing Symposium*. IEEE, 2003., Jul. 28, 2003, 8 pages.

Callahan, Timothy J., John R. Hauser, and John Wawrzynek. "The Garp Architecture and C Compiler." *Computer* 33.4 , Apr. 1, 2000, 62-69 pages.

Sheng Weiguang, Research on Key Technologies of Task Compilers for Coarse Grain Reconfigurable Architecture, Nov. 2011, 100 pages.

Ge Wei, Hybrid Register File Architecture Research for Reconfigurable Block Cipher Processor, Nov. 2015, 114 pages.

Yang Jinjiang, *Research on Key Technologies of Reconfigurable Cryptographic Processors*, Jul. 20, 2018, 116 pages.

Li Nianlong, Design and Implementation of Task Compiler for Remus-II Coarse-Grained Reconfigurable Processor, Dec. 2012, 72 pages.

Li Zhaoqi, Design and Optimization of Energy-Efficient Coarse Grained Reconfigurable Architecture for Block Cipher Algorithm, Dissertation for Master's Degree. Nanjing: Southeast University, May 19, 2017, 89 pages.

Zhao, Lifeng, Design and Optimization of Energy-Efficient Coarse Grained Reconfigurable Architecture for Block Cipher Algorithm, Thesis for Master's Degree: Southeast University, Jun. 2018, 95 pages.

Sun, Lei, Design and Implementation of a Reconfigurable Architecture Simulator for Block Ciphers, Thesis for Master's Degree: Southeast University, Sep. 14, 2018, 80 pages.

\* cited by examiner

INFORMATION SECURITY-ORIENTED RECONFIGURABLE SYSTEM CHIP COMPILER AND AUTOMATIC COMPILATION METHOD

TECHNICAL FIELD

The present disclosure relates to an information security application-oriented reconfigurable system chip compiler and an automatic compilation method, and belongs to the technical field of reconfigurable system chip compilation.

BACKGROUND

With the development and innovation of information technology, the demand for data processing ability of applications in the information explosion era is increasing. There are two traditional computation manners: an application specific integrated circuit (ASIC) and a general purpose processor (GPP). Because of the specificity and production characteristics of the ASIC, a hardware circuit cannot be changed once the ASIC is put into production. With the increasing complexity of a silicon manufacturing process, the one-time input is very expensive. Therefore, when the ASIC yield cannot reach a certain scale, a fully customized ASIC acceleration unit can only be used by a few computing logics with a large number of applications. The GPP executes a specific computing task by means of an instruction set, and accomplishes a computing task for different functions by modifying a sequence of the instruction set without requiring modification of the hardware circuit. Therefore, the GPP has good flexibility. However, in order to complete a computing task, the GPP needs to read instructions and data from a memory, and decode and execute the instructions and the data. A great performance overhead is required for each execution of the instructions, and therefore the performance of the GPP is generally far behind that of the ASIC.

A coarse-grained reconfigurable architecture (CGRA) may essentially be seen as "a trade-off between the high flexibility of the GPP and the high performance of the ASIC, and a combination of temporal and spatial computations". Meanwhile, compared with the GPP and the ASIC, a reconfigurable computing system achieves a trade-off between flexibility, performance, area, and power consumption, but also increases the application development cost due to the complexity thereof. The purpose of a reconfigurable compilation system is to compile an application program automatically to generate the reconfigurable computing system. A computationally intensive part of the application program is executed by a highly parallel hardware logical unit, so as to improve the execution performance of the application and provide hardware support for high-efficiency computing tasks. The highly-flexible GPP is used for working together to complete the computing tasks. With the development of information technology, the computational complexity of reconfigurable architecture applications is growing, especially important in computationally intensive cryptographic algorithms. The deployment of purely manual methods to reconfigurable computing platforms is not realistic. Therefore, it is very important to study how to improve information security-oriented automatic mapping of reconfigurable compilers. In recent years, it has become a research hotspot in the related field of reconfigurable computing.

A reconfigurable processor compilation system is a software system that translates application behaviors described by users in a high-level language into functionally equivalent binary machine codes recognizable by target hardware. The most important indicator of a compiler is correctness, which needs to ensure that a source program can be executed correctly on hardware. In addition, an excellent CGRA compilation system should also have the following features:

1) easy programming: a good upper programming interface for users is provided, bottom hardware features are not exposed upward too much, and programmers can realize application functions without knowing the hardware, whereby the productivity of programmers can be improved and the algorithm development cycle can be shortened;

2) development of more parallelism: the CGRA provides abundant computing units, which may perform parallel computing in time and space domains, and compilers need to effectively mine the hardware potential and parallel space of source programs, thereby accelerating the execution of source programs and improving the utilization of hardware resources; and 3) short compilation time: obviously, a smaller compilation time overhead is preferred, and in some applications requiring dynamic reconfiguration hardware, the compilation time is required more strictly. In summary, compilers provide users with a way to use hardware resources in a chip more conveniently, rapidly and efficiently.

Based on the above background, the design of an information security-oriented reconfigurable cryptographic chip compiler has become a hot issue of study. The existing design of compiler tools for reconfigurable chips based on cryptographic algorithms has been optimized to some extent, but in practical application, the mapping time and performance of algorithms have some differences due to the different understanding of hardware structures and algorithm protocols by algorithm developers.

SUMMARY

A technical problem to be resolved in the present disclosure is that in view of the above-mentioned prior art, a simple flow design of automatic mapping for an information security-oriented reconfigurable system chip compiler is proposed, which solves the problems of high requirements for algorithm mapping personnel, long algorithm mapping time period, difficulty in simulation debugging, and poor tolerance to hardware changes when the existing mapping technology is not mature enough.

To resolve the foregoing technical problem, the following technical solutions are used in the present disclosure:

The present disclosure firstly proposes an information security-oriented automatic compilation method of a reconfigurable system chip compiler, including:

S1: input of a source program of a cryptographic algorithm: describing a source program file in a high-level language containing a special mark designed based on the features of the cryptographic algorithm;

S2: execution of a software compilation function syntax check of the source program: performing function verification on an input algorithm description language, simulating an execution behavior of hardware, verifying whether the function is correct, if yes, proceeding to the next step, and if no, returning to the previous step;

S3: compilation mapping using a compiler: compiling, by the compiler, a source file with the correct function after verification to obtain a data flow diagram with data dependency;

S4: execution of the cryptographic algorithm by simulation running using a simulator: executing the data flow diagram with data dependency, which is compiled by the compiler, so as to obtain a simulation result;

S5: generation of a configuration code by a simulator array: mapping an array with a correct running result to generate a binary language file recognizable and executable by the hardware; and S6: hardware debugging: guiding a hardware behavior operation using a binary configuration code file generated by the simulator.

Further, according to the automatic compilation method of the reconfigurable system chip compiler proposed in the present disclosure, in step S1, a marked high-level C language used for describing the cryptographic algorithm supports at most two layers of For loop nesting rather than an irregular loop including while, and special operator functions of a basic function unit (BFU), a substitution box (SBOX) and a bit permutation unit (BENES) are used for programming.

Further, according to the automatic compilation method of the reconfigurable system chip compiler proposed in the present disclosure, in step S2, the simulation of an execution behavior of hardware includes an execution rule of hardware circuit logic and an execution scheme, including the function compilation of a BFU operator programming function, an SBOX operator programming function and a BENES operator programming function having functionality consistent with the hardware circuit description.

Further, according to the automatic compilation method of the reconfigurable system chip compiler proposed in the present disclosure, the BFU operator programming function is capable of implementing multiple operations fitting the features of a computationally intensive cryptographic algorithm.

Further, according to the automatic compilation method of the reconfigurable system chip compiler proposed in the present disclosure, the BFU operator programming function is capable of implementing an addition unit (AU), a logical unit (LU), a shift unit (SU), and a multiplication unit (MU). Each BFU has three 32-bit inputs and two 32-bit outputs, the three inputs of the BFU are named A, B and T respectively, and the outputs are named X and Y, X being a result output and Y being a bypass output.

Further, according to the automatic compilation method of the reconfigurable system chip compiler proposed in the present disclosure, a reconfigurable configuration line has four SBOXes, each SBOX has four lookup tables respectively divided into an upper sub-lookup table and a lower sub-lookup table, different sub-lookup tables are selected for lookup according to different configurations, and the SBOX also has different lookup modes to respectively realize different lookup functions.

Further, according to the automatic compilation method of the reconfigurable system chip compiler proposed in the present disclosure, the BENES operator programming function inputs four 32-bit operands and outputs four 32-bit data to implement an arbitrary bit permutation of 128-bit data, and each reconfigurable configuration line includes one 128-bit BENES for nonlinear bit permutation.

Further, according to the automatic compilation method of the reconfigurable system chip compiler proposed in the present disclosure, in step S4, the simulator translates a mapping diagram with data dependency generated by the verified source program to generate the form of a graphical interface, and generates a binary machine code recognized by target hardware for use by the hardware.

In order to solve the technical problem, the present disclosure also proposes an information security-oriented reconfigurable system chip compiler, including:

a source program input module, configured to describe a source program file in a high-level language containing a special mark designed based on the features of a cryptographic algorithm;

a software compilation function verification module, configured to perform function verification on an input algorithm description language, simulate an execution behavior of hardware, and verify whether the function is correct;

a compilation mapping module, configured to compile, by the compiler, a source file with the correct function after verification to obtain a data flow diagram with data dependency;

a simulation execution module, configured to execute the data flow diagram with data dependency, which is compiled by the compiler, so as to obtain a simulation result;

a configuration code generation module, configured to map an array with a correct running result to generate a binary language file recognizable and executable by the hardware; and a hardware debugging module, configured to guide a hardware behavior operation using a binary configuration code file generated by the simulator.

Further, according to the information security-oriented reconfigurable system chip compiler proposed in the present disclosure, the software compilation function verification module includes input and output FIFO modules, a shifting SREG storage unit module, an IMD immediate storage unit, an MEM data cache module, a BFU operator computation module, an SBOX nonlinear lookup table unit, and an execution function of a BENES bit permutation unit module.

The input FIFO module receives data with a width of 128-bit, stores the data in an internal memory, and updates the data after an operator reads the data on an interface, and the output FIFO module receives output data from a computation operator.

The IMD immediate storage unit is configured to store configuration data.

The shifting SREG storage unit module is configured to perform cache and shift computations of an intermediate process.

The MEM data cache module is configured to store initialized data and cached data of the intermediate process.

The BFU operator computation module is configured to implement an AU, an LU, an SU, and an MU. Each BFU has three 32-bit inputs and two 32-bit outputs, the three inputs of the BFU are named A, B and T respectively, and the outputs are named X and Y, X being a result output and Y being a bypass output.

The SBOX nonlinear lookup table unit is configured to select different sub-lookup tables for lookup according to different configurations, and realize different lookup functions according to different lookup modes.

The execution function of the BENES bit permutation unit module is configured to input four 32-bit operands and output four 32-bit data to implement an arbitrary bit permutation of 128-bit data, each reconfigurable configuration line including one 128-bit BENES for nonlinear bit permutation.

Compared with the prior art, the present disclosure has the following beneficial effects by using the foregoing technical solutions:

1. The problem of high requirements for algorithm mapping personnel is solved. Compared with the traditional automatic mapping flow for reconfigurable compilers, the present disclosure has lower requirements on algorithm mapping personnel, and software compilation debugging also has a certain flexibility compared with hardware simulation running.

2. Compared with the traditional automatic mapping flow for reconfigurable compilers, the present disclosure solves the problem of time consuming in the process of compiling a source code of a cryptographic algorithm to repeatedly perform mapping simulation and debugging due to the syntax and function compilation errors caused by incomplete understanding of users for the algorithm and insufficient experience in compiling software code.

3. Compared with the traditional automatic mapping flow for reconfigurable compilers, the present disclosure can present intermediate data of an algorithm implementation process on an operator port in the process of software pre-compilation, and this effect provides standard data for subsequent hardware simulation debugging and data flow update.

4. Compared with the traditional automatic mapping flow for reconfigurable compilers, the process of software debugging is relatively simple, and the running results of each cycle, i.e. the data of each cycle on a hardware interface or a data buffer, can be viewed in the process of debugging the source code.

5. Compared with the traditional automatic mapping flow for reconfigurable compilers, the process of software compilation debugging does not need to pay attention to mapping schemes, operator mapping layout and connection, thereby greatly reducing the requirements of algorithm developers and further shortening the development cycle.

DETAILED DESCRIPTION

Specific implementations of the present disclosure are further explained below with reference to the accompanying drawings. The following embodiments are merely used for more clearly describing the technical solutions of the present disclosure, and are not intended to limit the protection scope of the present disclosure.

The present disclosure discloses a simplified flow design of an information security-oriented reconfigurable system chip compilation framework. The flexibility is embodied in that a user can configure a hardware computing function, and a hardware parallel computing manner is adopted to achieve high performance. When realizing a certain computing function, the configuration scheme thereof is often a key to affect the computing performance. In order to solve the shortcomings of long manual configuration time, unstable effect and poor hardware inclusion, a reconfigurable processor generally uses a customized high-level language as input to shorten the development cycle of a reconfigurable system, thereby reducing the need for user hardware control, and mapping computing function units of each part to the reconfigurable processor in a more optimized manner, which is an indispensable part of the reconfigurable system.

The traditional compiler mapping and debugging scheme is a process from high-level language compilation to simulator simulation and debugging. In this process, the correctness of the syntax and function of a source code cannot be ensured. However, the simulator debugging and running process is time-consuming and laborious, and it is difficult to correct errors without intermediate process results. In order to solve this problem, the present disclosure proposes a software compilation and execution scheme to further speed up the flow of reconfigurable automatic mapping, thereby further reducing the requirements for hardware control.

Figure 1:
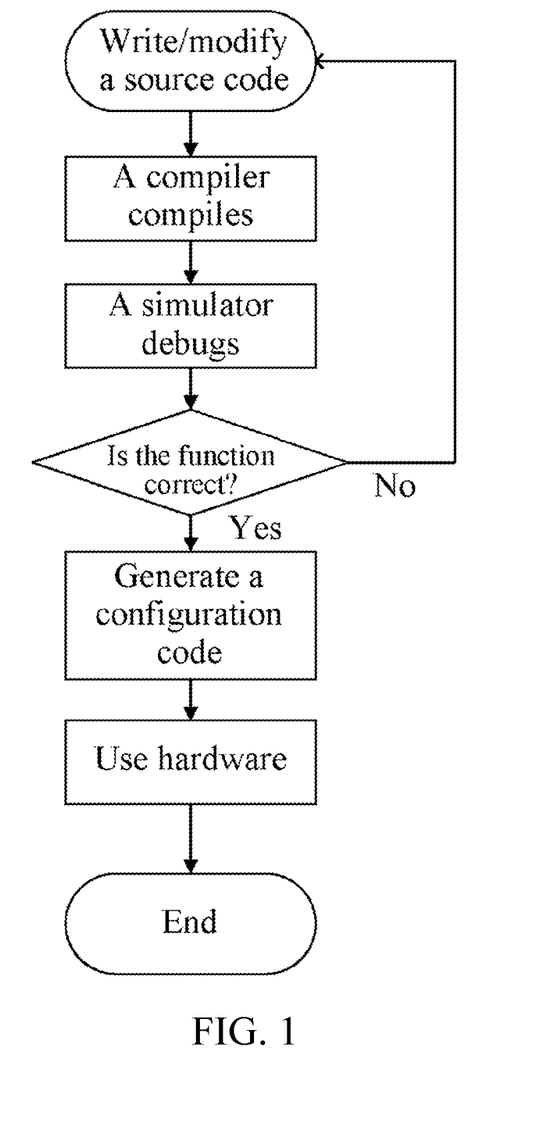
FIG. 1 is a flow chart of traditional reconfigurable architecture compilation automation mapping.

FIG. 1 shows a flow chart of traditional reconfigurable architecture compilation automation mapping. Firstly, a user writes a high-level language expression related to hardware through an algorithm protocol. Secondly, a compiled source program is compiled by a compiler, and then a compiled data flow diagram with certain data dependency is used for the simulation running operation of a simulator. Finally, a configuration code is generated from a mapping diagram with a correct simulation running result for use by the hardware. In this process, if there are some minor changes to the compiled source program, the above steps need to be performed again, which is a time-consuming and laborious process.

Figure 2:
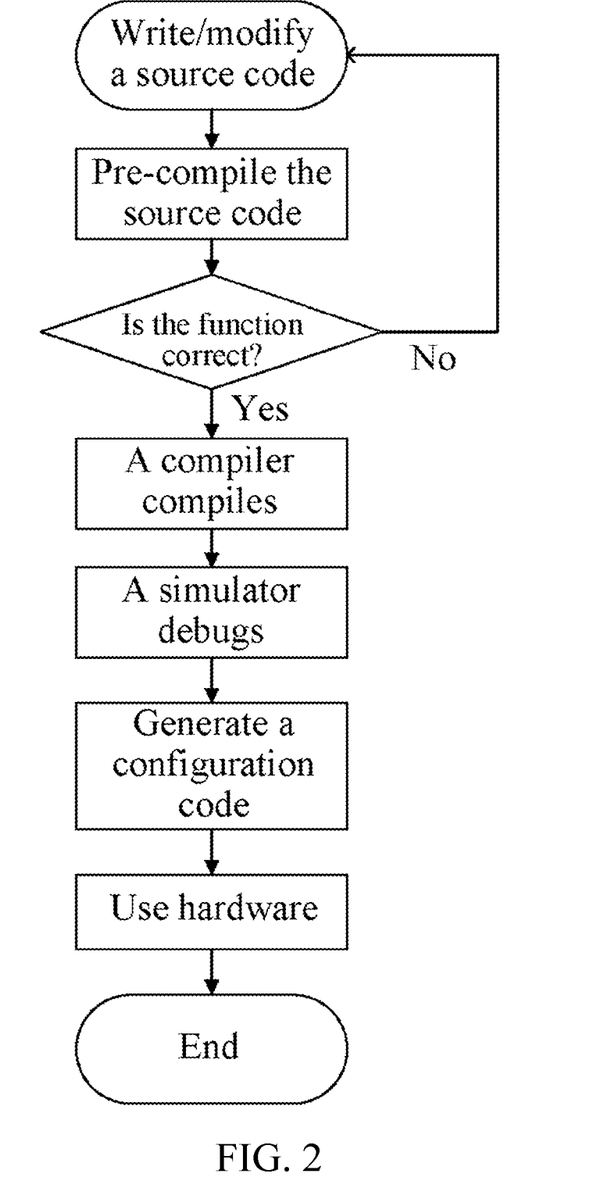
FIG. 2 is a flow chart of reconfigurable architecture compilation automation mapping according to the present disclosure.

Therefore, in order to further save time and further reduce the requirements for algorithm mapping personnel, the present disclosure proposes a pre-compilation checking module for reconfigurable compilation automatic mapping based on cryptographic algorithms. As shown in FIG. 2, the functional correctness of the written cryptographic algorithm is ensured by adding a pre-compilation flow of the source code. The software compilation has strong flexibility and can save a lot of debugging time of the compiler and the simulator. Firstly, the user writes the high-level language related to the hardware through the algorithm protocol. In this process, the user may not have sufficient knowledge of the protocol and hardware structure, and there are many problems and errors in the writing process. By adding this flow, the source program of the cryptographic algorithm can be ensured to be correctly executed before the compiler compiles. The compilation-correct mapping may be directly simulated by the simulator to generate a configuration code for the use by hardware.

The environment construction of a software compilation function verification module includes a hardware execution logic scheme, including input and output FIFO modules, a shifting SREG storage unit module, an IMD immediate storage unit, an MEM data cache module, a BFU operator computation module, an SBOX nonlinear lookup table unit, and an execution function of a BENES bit permutation unit module. After a certain cryptographic algorithm is compiled, software is executed by calling these functions, computing results are simulated in advance, and the software debugging has a certain degree of versatility and flexibility. The input and output results and the results of an intermediate process may be printed out by means of printing, so as to view data generation on a hardware interface, thereby further shortening the development cycle of the algorithm on the premise of ensuring the correct mapping of the algorithm.

Figure 3:
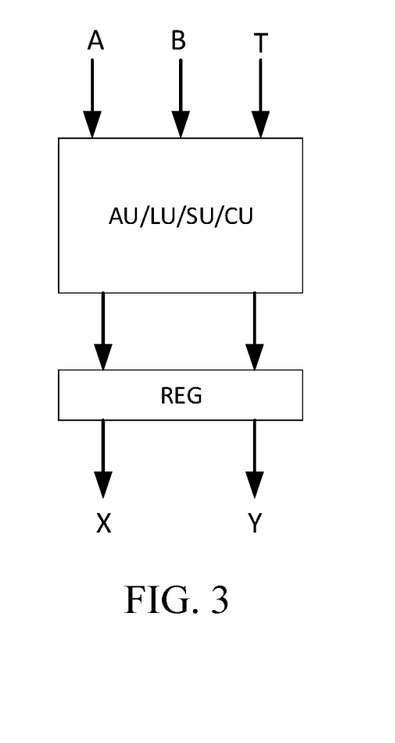
FIG. 3 is a schematic structure diagram of a BFU computation module according to the present disclosure.

FIG. 3 shows a schematic module diagram of a BFU, which has three 32-bit inputs and two 32-bit outputs, respectively represented by A, B, T, X, and Y, whereby an AU, an LU, an SU, and an MU can be implemented. Eight BFUs are included in a reconfigurable configuration line computation unit. Realizable logical operations include any combination of AND, OR, XOR, and three inputs. Realizable shift operations include a logical left shift, a logical right shift, a cyclic left shift, and a cyclic right shift. Realizable addition operations include: realizing a selectable parallel 4-way modulo $2^8$ addition, parallel 2-way modulo $2^{16}$ addition, modulo $2^{32}$ addition, and modulo $2^{32}-1$ addition. Meanwhile, an addition operation with a carry bit is supported to perform an X=A+B+T operation, where the $0^{th}$ bit of T is valid in a 32-bit addition mode. Realizable multiplication operations include: realizing a 16-bit multiplication, X[31:0]=A[15:0]*B[15:0], realizing an 8-bit multiplication, X[31:0]={8'b0, A[7:0]}*{8'b0, B[7:0]}. Logical functions to realize these functions are represented in a pre-compiled verification environment, and the source program will further verify the correctness of functionality in the form of software compilation, and a lot of time can be shortened compared with hardware debugging and software debugging.

Figure 4:
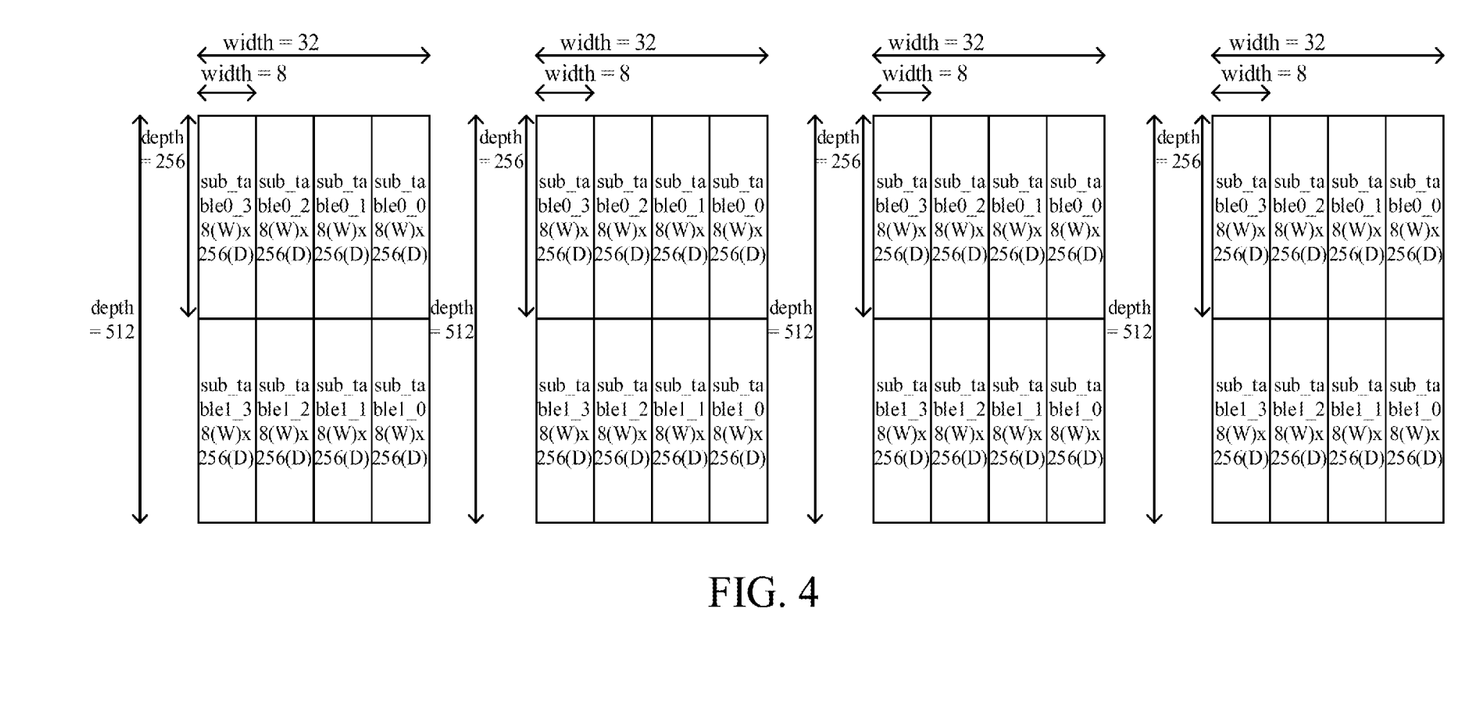
FIG. 4 is a schematic diagram of an SBOX lookup table according to the present disclosure.

As shown in FIG. 4, a reconfigurable configuration line has four SBOXes serving as nonlinear lookup units. Each SBOX has four lookup tables. Considering the use of lookup table resources as far as possible, each lookup table is respectively divided into an upper sub-lookup table and a lower sub-lookup table, different sub-lookup tables are selected for lookup according to different configurations, and the SBOX also has different modes to realize different lookup functions. In the framework of software compilation, a built-in function of SBOX is written, a lookup table resource file used by each cryptographic algorithm is added, and a lookup table operation may be performed according to certain rules by function call.

Figure 5:
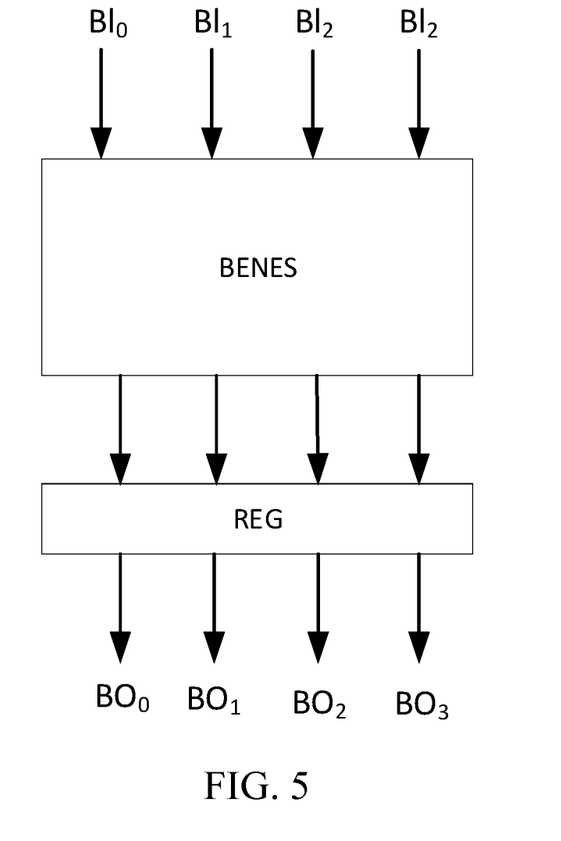
FIG. 5 is a schematic diagram of a 128-bit BENES according to the present disclosure.

As shown in FIG. 5, a BENES operator is used for realizing a permutation function of nonlinear operation bits. One BENES is included in a reconfigurable configuration line computation unit, and the BENES inputs four 32-bit operands and outputs four 32-bit data, so as to implement any bit permutation of 128-bit data. In the framework of software compilation, a built-in function of BENES is written, a permutation unit resource file used by each cryptographic algorithm is added, and a bit permutation operation may be performed according to certain rules by function call.

An embodiment of the present disclosure also provides an information security-oriented reconfigurable system chip compiler, including:
a source program input module, configured to describe a source program file in a high-level language containing a special mark designed based on the features of a cryptographic algorithm;
a software compilation function verification module, configured to perform function verification on an input algorithm description language, simulate an execution behavior of hardware, and verify whether the function is correct;
a compilation mapping module, configured to compile, by the compiler, a source file with the correct function after verification to obtain a data flow diagram with data dependency;
a simulation execution module, configured to execute the data flow diagram with data dependency, which is compiled by the compiler, so as to obtain a simulation result;
a configuration code generation module, configured to map an array with a correct running result to generate a binary language file recognizable and executable by the hardware; and
a hardware debugging module, configured to guide a hardware behavior operation using a binary configuration code file generated by the simulator.

Figure 6:
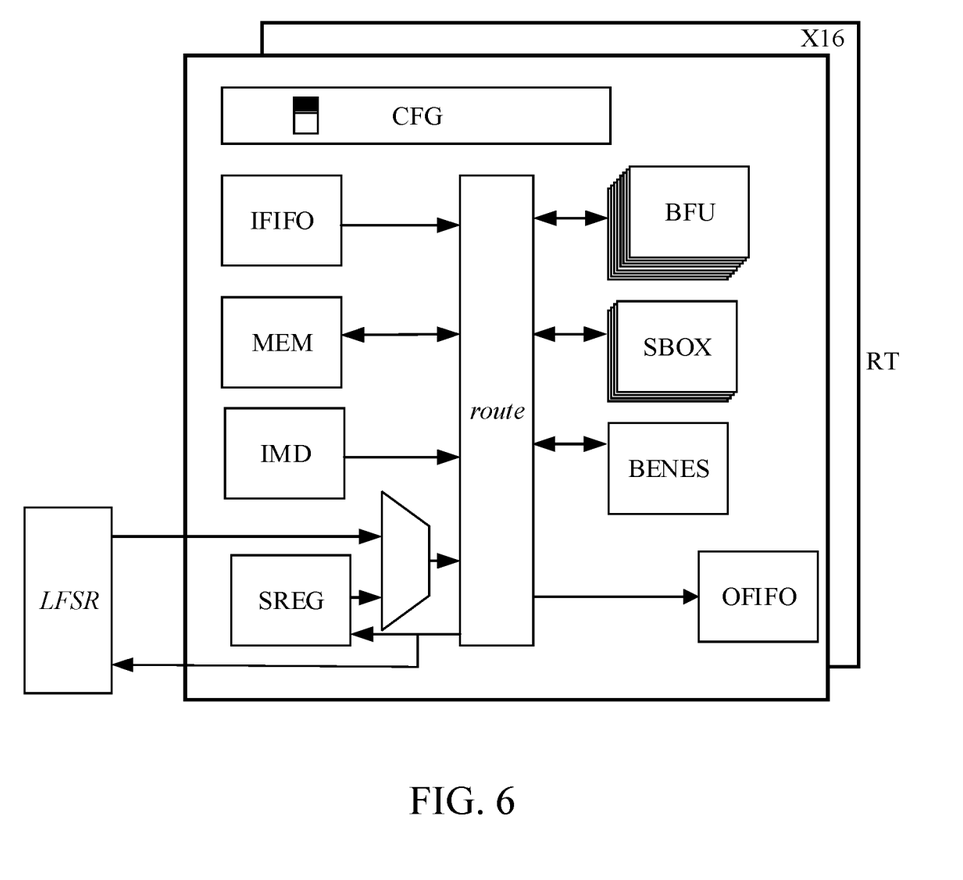
FIG. 6 is a schematic diagram of a built-in function module included in a software compilation environment according to the present disclosure.

A built-in function module included in a software compilation environment as shown in FIG. 6 includes a BFU which can realize logics such as addition, arithmetic logical operation, shift operation, and multiplication operation, an SBOX which realizes a more complex nonlinear operation, a BENES unit which realizes the permutation of a single Bit, a storage unit module (MEM) which is configured to store initialized data and cached data of an intermediate process, a cache unit (SREG) with a shift function, which is configured to perform cache and shift computations of the intermediate process, an input storage unit (IFIFO), an output storage unit (OFIFO), and a function unit (LFSR) module shiftable with fine granularity. In the software compilation environment, these function module units are implemented according to the logic of hardware, and the source code written by the algorithm mapping personnel is simulated and executed to verify the correctness of functionality, and the results in the intermediate process can be viewed to further shorten the development cycle of the algorithm.

The foregoing descriptions are merely exemplary implementations of the present disclosure. It should be noted that a person of ordinary skill in the art may make several improvements and modifications without departing from the principle of the present disclosure and the improvements and modifications shall fall within the protection scope of the present disclosure.

What is claimed is:

1. An information security-oriented automatic compilation method of a reconfigurable system chip compiler, comprising:
S1: input of a source program of a cryptographic algorithm: describing a source program file in a high-level language containing a special mark designed based on the features of the cryptographic algorithm;
S2: execution of a software compilation function syntax check of the source program: performing function verification on an input algorithm description language, simulating an execution behavior of hardware, verifying whether the function is correct, if yes, proceeding to the next step, and if no, returning to the previous step;
S3: compilation mapping using a compiler: compiling, by the compiler, a source file with the correct function after verification to obtain a data flow diagram with data dependency;
S4: execution of the cryptographic algorithm by simulation running using a simulator: executing the data flow diagram with data dependency, which is compiled by the compiler, so as to obtain a simulation result;
S5: generation of a configuration code by a simulator array: mapping an array with a correct running result to generate a binary language file recognizable and executable by the hardware; and
S6: hardware debugging: guiding a hardware behavior operation using a binary configuration code file generated by the simulator.

2. The automatic compilation method of the reconfigurable system chip compiler according to claim 1, wherein in step S1, a marked high-level C language used for describing the cryptographic algorithm supports at most two layers of For loop nesting rather than an irregular loop comprising while, and special operator functions of a basic function unit (BFU), a substitution box (SBOX) and a bit permutation unit (BENES) are used for programming.

3. The automatic compilation method of the reconfigurable system chip compiler according to claim 1, wherein in step S2, the simulation of an execution behavior of hardware comprises an execution rule of hardware circuit logic and an execution scheme, comprising the function compilation of a BFU operator programming function, an SBOX operator programming function and a BENES operator programming function having functionality consistent with the hardware circuit description.

4. The automatic compilation method of the reconfigurable system chip compiler according to claim 3, wherein the BFU operator programming function is capable of implementing multiple operations fitting the features of a computationally intensive cryptographic algorithm.

5. The automatic compilation method of the reconfigurable system chip compiler according to claim 4, wherein the BFU operator programming function is capable of implementing an addition unit (AU), a logical unit (LU), a shift unit (SU), and a multiplication unit (MU), wherein each BFU has three 32-bit inputs and two 32-bit outputs, the three inputs of the BFU are named A, B and T respectively, and the outputs are named X and Y, X being a result output and Y being a bypass output.

6. The automatic compilation method of the reconfigurable system chip compiler according to claim 3, wherein a reconfigurable configuration line has four SBOXes, each SBOX has four lookup tables respectively divided into an upper sub-lookup table and a lower sub-lookup table, different sub-lookup tables are selected for lookup according to different configurations, and the SBOX also has different lookup modes to respectively realize different lookup functions.

7. The automatic compilation method of the reconfigurable system chip compiler according to claim 3, wherein the BENES operator programming function inputs four 32-bit operands and outputs four 32-bit data to implement an arbitrary bit permutation of 128-bit data, and each reconfigurable configuration line comprises one 128-bit BENES for nonlinear bit permutation.

8. The automatic compilation method of the reconfigurable system chip compiler according to claim 1, wherein in step S4, the simulator translates a mapping diagram with data dependency generated by the verified source program to generate the form of a graphical interface, and generates a binary machine code recognized by target hardware for use by the hardware.

9. An information security-oriented reconfigurable system chip compiler, comprising:
a source program input module, configured to describe a source program file in a high-level language containing a special mark designed based on the features of a cryptographic algorithm;
a software compilation function verification module, configured to perform function verification on an input algorithm description language, simulate an execution behavior of hardware, and verify whether the function is correct;
a compilation mapping module, configured to compile, by the compiler, a source file with the correct function after verification to obtain a data flow diagram with data dependency;
a simulation execution module, configured to execute the data flow diagram with data dependency, which is compiled by the compiler, so as to obtain a simulation result;
a configuration code generation module, configured to map an array with a correct running result to generate a binary language file recognizable and executable by the hardware; and
a hardware debugging module, configured to guide a hardware behavior operation using a binary configuration code file generated by the simulator.

10. The information security-oriented reconfigurable system chip compiler according to claim 9, wherein the software compilation function verification module comprises input and output FIFO modules, an IMD immediate storage unit, a shifting SREG storage unit module, an MEM data cache module, a BFU operator computation module, an SBOX nonlinear lookup table unit, and an execution function of a BENES bit permutation unit module, wherein
the input FIFO module receives data with a width of 128-bit, stores the data in an internal memory, and updates the data after an operator reads the data on an interface, and the output FIFO module receives output data from a computation operator;
the IMD immediate storage unit is configured to store configuration data;
the shifting SREG storage unit module is configured to perform cache and shift computations of an intermediate process;
the MEM data cache module is configured to store initialized data and cached data of the intermediate process;
the BFU operator computation module is configured to implement an addition unit (AU), a logical unit (LU), a shift unit (SU), and a multiplication unit (MU), wherein each BFU has three 32-bit inputs and two 32-bit outputs, the three inputs of the BFU are named A, B and T respectively, and the outputs are named X and Y, X being a result output and Y being a bypass output;
the SBOX nonlinear lookup table unit is configured to select different sub-lookup tables for lookup according to different configurations, and realize different lookup functions according to different lookup modes; and
the execution function of the BENES bit permutation unit module is configured to input four 32-bit operands and output four 32-bit data to implement an arbitrary bit permutation of 128-bit data, each reconfigurable configuration line comprising one 128-bit BENES for nonlinear bit permutation.

* * * * *